United States Patent [19]
Reynolds

[11] 3,826,285
[45] July 30, 1974

[54] HOLLOW TUBE OF VARIABLE EXTERIOR DIMENSIONS

[76] Inventor: Frank J. Reynolds, 1616 Van Buren Dr., North Brunswick, N.J. 08902

[22] Filed: Oct. 24, 1972

[21] Appl. No.: 300,147

[52] U.S. Cl.............................. 138/103, 138/177
[51] Int. Cl............................................. F16l 9/12
[58] Field of Search................ 138/178, 103, 177

[56] References Cited
UNITED STATES PATENTS
3,143,794  8/1964  Martin-Hurst.................. 285/226 X Primary Examiner—Jerry W. Myracle
Attorney, Agent, or Firm—Diller, Brown, Ramik & Wight

[57] ABSTRACT

This invention relates to an article of manufacture and more particularly a hollow extruded tube of variable exterior dimensions formed of preheated, drawn down and thereafter cooled thermoplastic material having a plurality of elements internally interlocked therewith in spaced relationship to each other whereby in outward appearance the tube may be best described as "facsimile" bamboo and is adapted for use as a percussion instrument, the game of tinikling, fishing pole sections, structural elements, etc.

13 Claims, 2 Drawing Figures

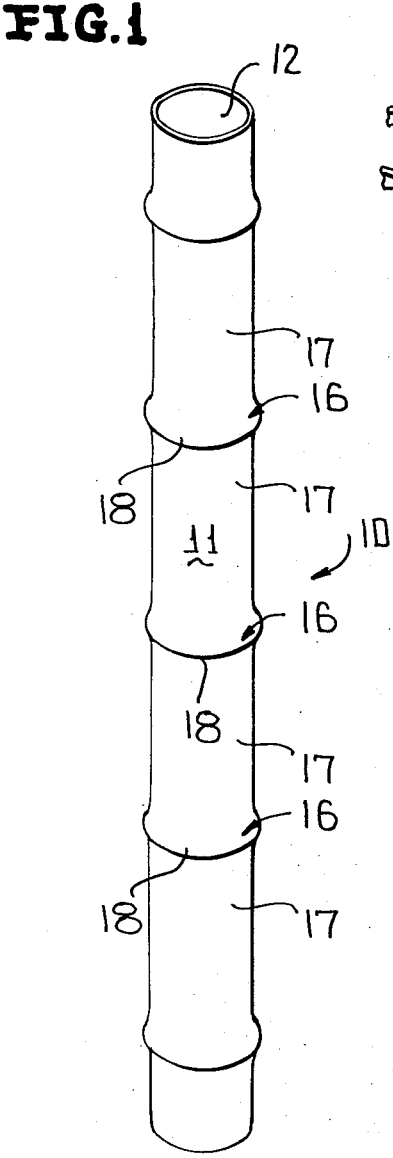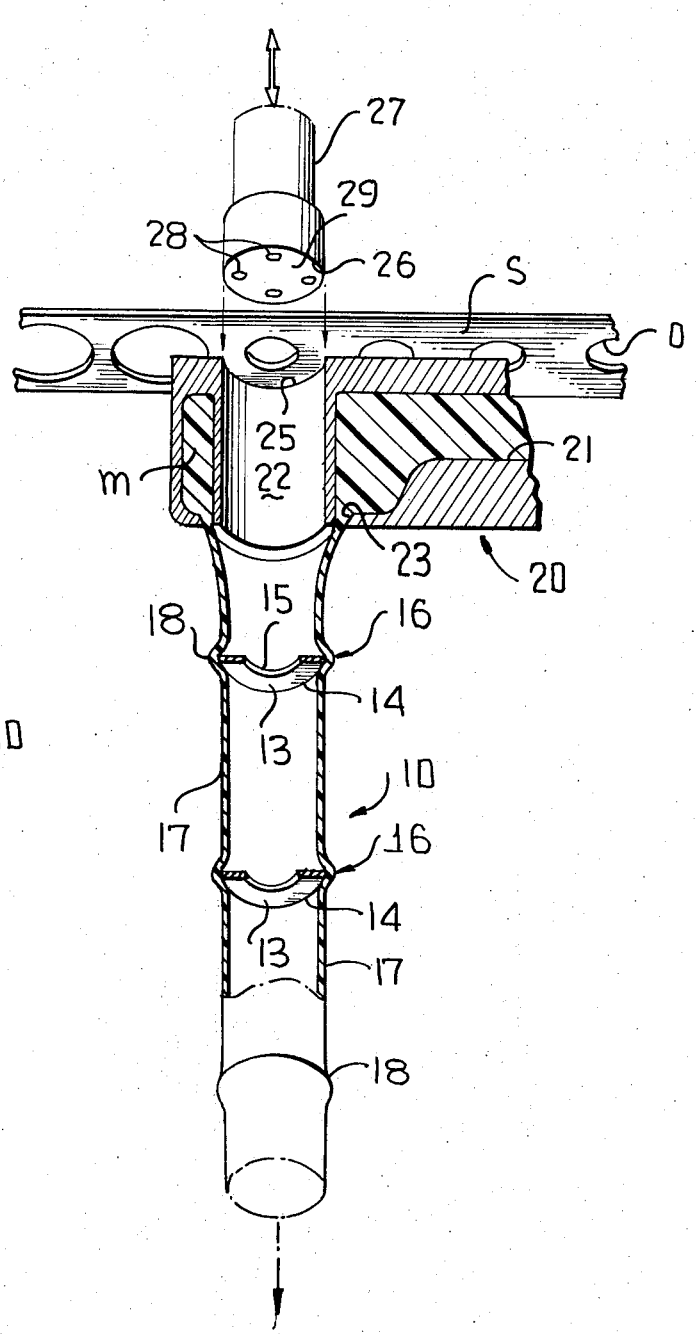

HOLLOW TUBE OF VARIABLE EXTERIOR DIMENSIONS

In accordance with the method a heated hollow tubular parison or hot hollow plastic tube is continuously extruded and inserted therein in spaced relationship are a plurality of elements held in spaced relationship upon the shrinking of the tubular parison during draw down which additionally interlocks the elements and the parison while further producing the "facsimile" bamboo appearance heretofore noted.

A primary object of this invention is a novel method of manufacturing a hollow tube of variable exterior dimensions by first continuously extruding a heated hollow tubular parison or tube of thermoplastic material which is subject to draw down as it cools, inserting a plurality of elements into the tubular parison during the extruding thereof with the elements being in spaced relationship to each other, drawing down the tubular parison in excess of the exterior dimensions of the elements to interlock the elements and parison and additionally create between elements an exterior parison dimension less than that at the elements, and severing a length of parison containing a multiplicity of the elements therein thereby forming the hollow tube of variable exterior dimensions.

In accordance with the first-mentioned object, the method is further defined to achieve a variety of different articles for different purposes by constructing the elements from a variety of materials in different shapes as, for example, constructing the elements as apertured thin discs, discs of regular peripheral outline, discs of varied peripheral outline, unapertured thin discs, permeable material discs, etc. Thus, in the case of thin uniformly circular discs the eventual hollow tube has the appearance of "facsimile" bamboo which may or may not be exteriorly printed, coated, etc. to achieve the appearance of "natural" bamboo. Such "facsimile" bamboo may be used for a multiplicity of purposes as, for example, in the game of "tinikling" or a single or a pair of such hollow tubes may be used as percussion instruments by striking one against another object or two or more against each other, with different sounds being created by the variables heretofore described relative to the elements internally of the tube.

With the above and other objects in view that will hereinafter appear, the nature of the invention will be more clearly understood by reference to the following detailed description, the appended claimed subject matter and the several views illustrated in the accompanying drawing.

IN THE DRAWING

FIG. 1 is a perspective view of a novel hollow extruded tube constructed in accordance with this invention, and illustrates the variable exterior dimensions thereof which imparts thereto a "facsimile" bamboo appearance.

FIG. 2 is a fragmentary sectional view of an extrusion nozzle cooperative with a punch, and graphically illustrates the manner in which the hollow tube of FIG. 1 is formed by extruding a heated parison which is drawn down to interlock interiorly thereof a plurality of thin apertured discs with the drawing down additionally achieving the variable exterior appearance of the tube of FIG. 1.

A novel article of manufacture constructed in accordance with this invention is fully illustrated in FIG. 1 of the drawing, and is generally designated by the reference numeral 10. The article 10 is a hollow extruded tube having an exterior surface 11, an interior surface 12, and an exterior length which may be varied as found necessary or desirable depending, of course, upon the particular usage of the tube 10. The tube 10 is formed of preheated and thereafter cooled and shrunk thermoplastic material as, for example, polystyrene or similar polymer or modified polymer plastics.

A plurality of elements 13 (FIG. 2) are located internally of the tube in axial spaced relationship to each other. Each element 13 in the illustrated embodiment of the invention is a thin circular disc having an outer periphery 14 and an aperture 15 which is axially or otherwise located.

Means, generally designated by the reference numeral 16 are provided for interlockingly securing the peripheries 14 of each element 13 to the interior surface 12 of the tube 10. Each interlocking means 16 is simply a drawn down portion 17 of the tube 10 at each axial side of the plurality of elements 13 whereby portions 18 of the tube 10 therebetween are conformed to and interlock with the peripheries 14 of each of the elements 13. That is, as the thermoplastic material of the hollow tube is drawn down after its extrusion, as will be described more fully hereinafter in conjunction with FIG. 2, the material of each portion 17 is capable of being drawn down to a greater extent than the portions 18 due to the absence of internal restraints, such as the elements 13. However, in the case of the portions 18, the same draw down occurs but to a lesser extent due to the restraint offered by the peripheries 14 of the elements 13.

In view of the circular outline of the peripheries 14 of the elements 13 the hollow tube 10 has the appearance of natural bamboo and thus may be considered "facsimile" bamboo usable for a variety of purposes as, for example, decoration, a percussion instrument, the game of "tinikling," elements for interior design, furniture construction, fishing rod sections, etc. Thus though the regularity in the peripheral shape of the discs 13 and the spacing therebetween produces the tube 10 which in appearance resembles natural bamboo, the elements 13 may be changed in a variety of ways to achieve different effects, as will be described more fully hereinafter in conjunction with the description of FIG. 2.

The hollow tube 10 of FIG. 1 is likewise designated with similar reference numerals in FIG. 2 but will be considered a parison for purposes of describing the method and thus for purposes of interpretation the words "tube" and "parison" may be considered interchangeable.

In accordance with the method of this invention there is provided conventional apparatus which includes an extrusion head 20 having a passage or chamber 21 which in conjunction with a cylindrical port 22 defines an extrusion orifice 23 of a generally annular configuration. An upper edge 25 of the port 22 constitutes a die or female cutting edge cooperative with a male cutting edge 26 of a punch 27 for severing the elements 13 from a strip S of suitable material having prepunched openings O therein. The strip S may be, for example, constructed from paper stock, plastic or similar material and is fed from right-to-left as viewed in FIG. 2 by conventional machinery. The feed of the strip S is in a stepwise fashion and is suitably synchronized with the operation of the punch 27 and the extrusion of the plastic material M through the orifice 23 such that upon each descent of the punch 27 a disc 13 will be severed therefrom and introduced into the parison 10 through the port 22. The disc 13 so severed may simply freefall by gravity into the interior of the parison 10, but preferably the punch 27 includes a plurality of bores or ports 28 in a lower face 29 thereof which are suitably placed in fluid communication with a vacuum source through an appropriate valve (not shown). The unillustrated valve is operative to adhere each element 13 to the face 29 of the punch 27 upon its severance from the strip S and to release the same at the bottom of the stroke of the punch 27 when the periphery adjacent the cutting edge 26 is of a dimension generally corresponding to a like dimension of the parison 10 as it is drawn down upon being extruded outwardly of the orifice 23. In other words the parison 10 though initially of a diameter substantially larger than the periphery 14 of each disc 13 progressively tapers as it is drawn down to a smaller diameter eventually corresponding to that of the periphery 14 of each disc 13 whereupon the vacuum is released and the element 13 is carried downwardly by the parison 10 as the punch 27 is retracted. During this subsequent downward movement of the parison 10 the material M cools, solidifying sections 17 and the interlocks at 16 between the portions 18 and the peripheries 14 of the discs 13.

It is to be appreciated that the distance between the discs 13 can be varied in a number of ways as, for example, by increasing the speed of extrusion of the material M through the orifice 23, decreasing the same, varying the speed of the punch 27, etc. Moreover, the shape of the orifice 23 may be varied to achieve in conjunction with the port 22 profiles other than perfectly circular as, for example, triangular, square, oblong, etc. The inserts in the latter case would, of course, correspond generally to the cross-sections of the extruded parison, and thereby achieving hollow tubes which deviate from the "facsimile" bamboo and are thus more readily used for furniture construction, interior decoration, etc.

In further keeping with this invention the size and shape of the apertures 15 in the inserts 13 may be varied to increase or decrease structural rigidity, vary the pitch of sounds emanating when the hollow tube 10 if used during "tinikling" or as a percussion instrument, and more importantly to permit gases to flow interiorly of the parison 10 of FIG. 2 during the extruding thereof, it being known that such gases emanate from the polymeric or copolymeric material M or may be introduced thereinto in a conventional manner by, for example, providing suitable ports in the wall (unnumbered) of the port 22 and coupling the same to inert or similar gas to maintain interior control dimensionwise of the parison 10 as it is being extruded. In lieu of the openings 15 the inserts 13 may simply be constructed from extremely permeable material and the prepunching to form the openings O may be eliminated. Moreover, the inserts 13 need not be provided in strip form and could instead simply be fed by appropriate conventional machinery to a position above the port 22 and fed downwardly therefrom, thus eliminating the severing operation achieved by the descent of the punch 27. Depending, of course, upon the exterior design and/or cross sectional configuration desired of the hollow tube 10, the inserts 13 may be all of dissimilar exterior peripheries to achieve an irregular exterior, again for esthetic, design and/or tonal qualities.

The term "draw down" is used herein to describe the process of pulling the extrudate, parison, or hot tube 10 away from the die 20 at a linear speed higher than that at which the melt is emerging from the orifice 23, thus reducing the cross section dimensions of the tube 10 and/or its diameter be it by gravity alone or conventional mechanisms.

Although only a preferred embodiment of the invention has been specifically illustrated and described herein, it is to be understood that minor modifications may be made therein without departing from the sphere and scope of the invention, as defined by the appended claims.

I claim:

1. An article of manufacture comprising a rigid hollow extruded tube of variable exterior dimensions formed of preheated and thereafter cooled thermoplastic polymeric material, a plurality of elements internally of said tube in spaced relationship to each other, means interlockingly securing a periphery of each element to the tube interior, said interlocking means being a drawn down portion of the polymeric tube at each side of each element whereby the material between adjacent drawn down portions conforms to and interlocks with the periphery of the associated element.

2. The article as defined in claim 1 wherein said elements are formed of permeable material.

3. The article as defined in claim 1 wherein said elements are apertured.

4. The article as defined in claim 1 wherein said elements are thin flat-sided circular discs.

5. The article as defined in claim 1 wherein said elements are apertured thin flat-sided circular discs.

6. The article as defined in claim 1 wherein said elements are generally similarly exteriorly peripherally contoured.

7. The article as defined in claim 6 wherein said elements are thin flat-sided circular discs.

8. The article as defined in claim 1 wherein said elements are generally dissimilarly exteriorly peripherally contoured.

9. The article as defined in claim 8 wherein said elements are thin flat-sided discs.

10. The article as defined in claim 1 wherein the polymeric material between adjacent elements has a rightcylindrical cross-sectional configuration extending substantially the entire distance between said elements.

11. The article as defined in claim 10 wherein said elements are thin flat-sided circular discs.

12. The article as defined in claim 10 wherein said elements are apertured thin flat-sided circular discs.

13. The article as defined in claim 10 wherein said elements are generally dissimilarly exteriorly peripherally contoured.

* * * * *